Figure 1:
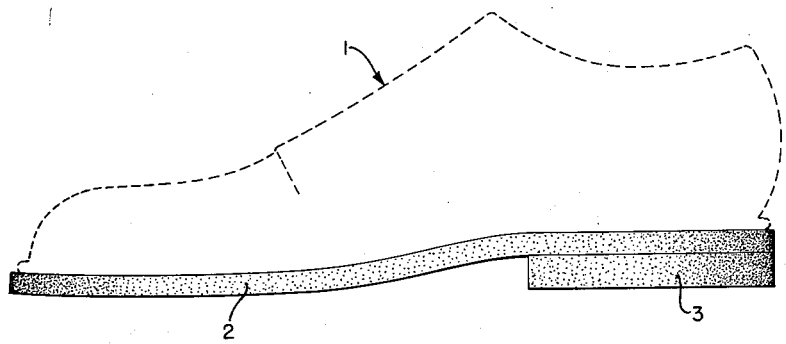

Feb. 20, 1962 G. H. GATES ETAL 3,022,257
COMPOSITION COMPRISING POLYESTER, DIISOCYANATE AND CELLULOSIC
FILLER AND WEARING SURFACE FOR SHOE PREPARED THEREFROM
Filed Oct. 31, 1958

INVENTORS
GEORGE H. GATES
ANTHONY F. FINELLI
BY

ATTORNEY 3,022,257
COMPOSITION COMPRISING POLYESTER, DIISOCYANATE AND CELLULOSIC FILLER AND WEARING SURFACE FOR SHOE PREPARED THEREFROM
George H. Gates, Cuyahoga Falls, and Anthony F. Finelli, Akron, Ohio, assignors to The Goodyear Tire & Rubber Company, Akron, Ohio, a corporation of Ohio
Filed Oct. 31, 1958, Ser. No. 770,962
10 Claims. (Cl. 260—9)

This invention relates to shoe compositions and more particularly to such compositions used in the wearing surfaces of shoes such as soles or heels.

It is the object of this invention to provide urethane compositions having the hardness, the outstanding wear resistance, the good nail holding properties and the resistance to chipping, spreading and splitting required for high quality shoe soles and heels and particularly required for high quality top lifts for women's dress shoes. Other objects will appear as the description proceeds.

These objects are accomplished by employing, as the shoe wearing surfaces, urethane compositions containing certain polyesters, diisocyanates, reticulators and fillers as will be more fully set forth below.

The polyesters employed in preparing the shoe compositions of this invention are polyethylene adipates having an average molecular weight of from 900 to 1500 and an acid number not greater than 5. These polyesters are prepared by the condensation reaction between ethylene glycol and adipic acid with the glycol being present in an excess of approximately 30% in order to minimize the acid number of the polyester. Preferred polyethylene adipates are those having an average molecular weight of approximately 100.

The diisocyanates employed to modify the polyester to form the urethane compositions of this invention are 3,3'-dimethyl 4,4'-diphenyl diisocyanate, diphenyl methane 4,4'-diisocyanate, the tolylene diisocyanates such as 2,4-tolylene diisocyanate and 2,6-tolylene diisocyanate or mixtures of these tolylene diisocyanates.

With the tolylene diisocyanates an aromatic diamine is employed as the reticulator or cross-linker. Representative examples of the aromatic diamines useful as the reticulator in preparing the urethane compositions of this invention which may be employed alone or in mixtures of two or more are benzidine, tolidine, 1,5-naphthalene diamine, tolylene diamine with the chlorinated aromatic diamines such as methylene bis-orthochloroaniline, isopropylidene bis ortho-chloro-aniline and ortho dichloro benzidine being particularly preferred.

With 3,3'-dimethyl 4,4'-diphenylene disocyanate and/or diphenyl methane 4,4'-diisocyanate a glycol is employed as the reticulator for preparing the urethane compositions of this invention. Representative examples of the glycols which may be employed alone or in mixture of two or more are ethylene glycol, propylene glycol, butanediol-1,4, paraxylylene glycol, the bis hydroxyethyl ether of hydroquinone and the chlorinated derivatives of the aromatic glycols.

It has been found that the particular combinations of diisocyanate and reticulator indicated above are those which provide the required hardness and wear resistance to the urethane compositions. The amount of reticulator employed is from 0.5 to 0.8 mol per mol of polyester. The amount of diisocyanate employed is from 1.7 to 2.2 mols per mol of polyester with the diisocyanate being provided in a molar excess of at least 10% more than the sum of the molecular amounts of polyester and reticulator. It has been observed that, if less than the indicated minimum amounts of reticulator and diisocyanate are employed the polyurethane composition resulting does not possess sufficient hardness to provide a satisfactory shoe sole or heel composition. Amounts of reticulator and diisocyanate above the maximums indicated do not appreciably add to the desired properties in the urethane compositions and represent a waste of expensive reactants which add to the cost of the composition produced.

The fillers employed in preparing the urethane compositions are cellulosic powders or flours obtained by the grinding of such materials as walnut shells, pecan shells, cashew nut shells, peanut shells and various woods such as pine, spruce or fir with the harder woods such as oak, maple, walnut or elm being preferred. Of these cellulosic flours the relatively hard nut flours such as walnut shell flour and pecan shell flour are particularly preferred. The cellulosic flours have been found to produce in the cured urethane composition the desired wearing properties or abrasion resistance, the nail holding properties and the resistance to chipping, spreading and splitting which must be possessed by a shoe wearing surface of high quality. It has been found that for best results the cellulosic flour should be finely ground to a size of at least 100 mesh and preferably 200 mesh. The amount of filler employed is from 60 to 90 parts by weight per 100 parts by weight of polyester with the preferred amount being 75 parts by weight. Amounts of filler in excess of 90 parts by weight caused the otherwise liquid polyester to which it is added to become so thick or viscous as to complicate the satisfactory processing of the reaction mixture into the desired end product. Amounts of filler less than 60 parts by weight result in compositions having less desirable physical properties particularly with regard to the ability to hold nails employed in attaching the sole or heel to the shoe upper.

Smaller amount of other fillers such as finely ground pumice stone or talc may be employed in combination with the cellulosic flour although it has been generally observed that the use of other fillers decreases the wear resistance of the composition. In this connection it should be appreciated that fillers having a low bulk density should not be employed since this type of filler tends to absorb the liquid polyester and prevent the satisfactory handling of the liquid reaction mixture.

The urethane compositions of this invention are prepared by heating the liquid polyethylene adipate to a temperature of from 80 to 90° C. after which the filler is added to form a rather viscous, pasty slurry. With the subsequent addition of the diisocyanate the reaction mixture becomes more fluid as the temperature rises to approximately 115° C. during the exothermic reaction between the polyester and the isocyanate. Following a mixing of from 15 to 35 minutes the reticulator is added and blended with the reaction mixture for approximately 30 seconds. The mixture is then poured into a curing mold and press cured for approximately 30 minutes at 290° F. followed by a post cure for approximately 16 hours at 230° F., it being understood that these mixing times and curing times can be varied both as to temperature and time as the nature of the specific composition requires.

In preparing the shoe wearing surfaces, it is possible either to pour the reaction mixture into molds designed in the shape of a shoe sole or a heel or it is possible to cast the composiiton in sheet form and die out the soles or heels desired from the cured sheet.

This invention is further illustrated with respect to the drawings in which:

FIG. 1 is a representation of a man's shoe 1, the sole 2 and/or heel 3 of which are made from the urethane composition. Another use for the urethane composition of this invention is as an insert or plug in a man's heel at those points where the wear is most severe, the balance of the heel being of a more conventional composition such as rubber or leather.

Figure 2:
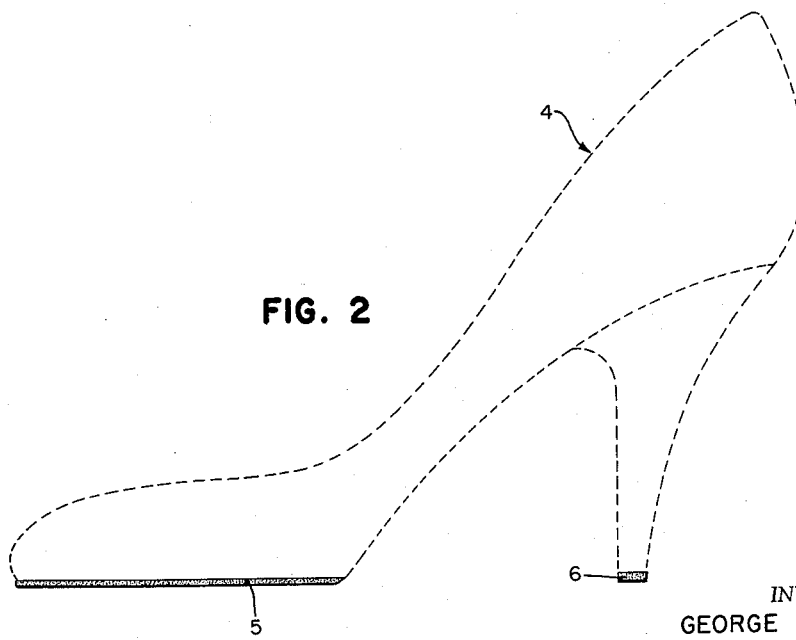

FIG. 2 is a representation of a woman's shoe 4, the sole 5 and/or top lift 6 of which are made from the urethane composition.

The practice of this invention is further illustrated with respect to the following examples which are representative rather than limitative of the scope of this invention. In these examples, unless otherwise specified, parts are shown by weight.

*Example 1*

A polyethylene adipate (400 parts) having an average molecular weight of 1030 and an acid number of 0.8 was added to a 2-liter resin pot. To this was added 300 parts of 200-mesh dried walnut shell flour. The slurry was heated at 120° C. with gentle stirring for 30 minutes after which 215 parts of 3,3'-dimethyl 4,4'-diphenylene diisocyanate was added. A slurry which gradually became more fluid was stirred for 17 minutes at from 110 to 115° C. after which 20 grams of ethylene glycol was added. The complete mixture was vigorously stirred and after 2 minutes poured into a mold and press cured for 1 hour at 265° F. The cured slab was placed in an air oven for 16 hours at 260° F. to insure completion of the cure. Physical tests performed on the cured material showed the following properties:

| | |
|---|---|
| Hardness (Shore D durometer) | 54 |
| Spread percent | 5 |
| Abrasion do | 132 |
| Nail pull pounds | 14 |

*Example 2*

A polyethylene adiapate (400 parts) having an average molecular weight of 1020 and an acid number of 0.6 and 300 parts of 200-mesh walnut flour were placed in a 2-liter resin kettle. The mixture was heated to 97° C. with gentle stirring after which 137 grams of 2,4-tolylene diisocyanate was added. With gentle stirring the reaction mixure became more fluid and the temperature rose to 108 to 115° C. over 17 minutes. Methylene bis ortho-chloro-aniline (79.5 parts) was added in the form of a melt at 135–150° C. The mixture was vigorously stirred for 30 seconds after which it was poured into a mold and press cured for 30 minutes at 290° F. A complete cure of the molded slab was obtained by placing it in an air oven for 16 hours at 230° F. Physical tests performed on the cured sample showed the following results:

| | |
|---|---|
| Hardness (Shore D durometer) | 66 |
| Spread percent | 5 |
| Abrasion do | 122 |
| Nail pull pounds | 24 |

*Example 3*

The same procedure was followed as described in Example 2 except a mixture of 80% by weight 2,4-tolylene diisocyanate and 20% by weight of 2,6-tolylene diisocyanate was employed and the time of mixing before the addition of the diamine was 35 minutes. Physical tests performed on the cured material showed the following results:

| | |
|---|---|
| Hardness (Shore D durometer) | 66 |
| Spread percent | 5.5 |
| Abrasion do | 159 |
| Nail pull pounds | 31 |

*Example 4*

A polyethylene adipate (400 parts) having an average molecular weight of 1000 and an acid number of 0.8 and 300 parts of pecan shell flour (200-mesh) were added to a 2-liter resin pot and heated at 85° C. with gentle stirring for 33 minues after which 140 parts of a mixture of 80% by weight of 2,4-tolylene diisocyanate and 20% by weight of 2,6-tolylene diisocyanate was added. A slurry which gradually became more fluid was stirred for 40 minutes during which time the temperature rose to 110° to 1130 C. after which 80 parts of methylene bis ortho-chloro-aniline was added in the form of a melt at 135° C. The complete mixture was vigorously stirred for 25 seconds and then poured into a mold and press cured for 35 minutes at 290° F. followed by an air oven cure for 16 hours at 230° F. Physical tests performed on the cured sample showed the following properties:

| | |
|---|---|
| Hardness (Shore D durometer) | 67 |
| Spread percent | 6.1 |
| Abrasion do | 148 |
| Nail pull pounds | 22 |

In the above examples the spread properties are expressed in terms of the percent loss in thickness of a $\frac{3}{16}$-inch thick sample, ½ inch in diameter which is first conditioned at 110° F. for 30 minutes, then subjected at 110° F. to a pressure of 2000 pounds for 30 seconds and then released to stand at room temperature for 30 minutes before the reduced thickness is measured. Abrasion tests were conducted in accordance with the Bureau of Standard Abrasion (A.S.T.M. D–394–47–Method B). The nail pull properties were determined by attaching a portion of the cured material in the form of a woman's top lift to a heel base with a cloth layer between the top lift and the heel base, the attachment being provided through 3 nails in the form of wire conventionally employed in attaching top lifts to the heel base. The cloth layer is subjected to a pull in the direction of the axis of the nail at the rate of 2 inches per minute and the nail pull is determined by measuring the pounds pull required to either pull the nail from the heel base or pull the top lift through the nail.

The very low spread properties evidenced by the results shown in the examples above make the urethane compositions of this invention outstandingly useful in shoe soles and heels and particularly in women's top lifts where the weight of the wearer is distributed over an extremely small cross section. The outstanding abrasion results are evidence of the long wearing properties of the urethane compositions while the outstanding nail pulling properties permits the simple attachment of a shoe element such as a top lift through the use of 3 nails and without requiring the use of adhesives, all of which adds to the ease of fabrication of the shoe.

In addition to the specific cellulosic flours, the specific reticulators and the specific operating conditions reported in the examples above, other cellulosic flours such as the wood flours, as well as other diamine and glycol reticulators, may be employed to prepare the compositions of this invention and to achieve the outstanding properties in the urethane compositions so long as the limitations more specifically set forth above are followed.

While certain representative embodiments and details have been shown for the purpose of illustrating the invention, it will be apparent to those skilled in this art that various changes and modifications may be made therein without departing from the spirit or scope of the invention.

What is claimed is:

1. A wearing surface for a shoe comprising a cured polyurethane composition resulting from the reaction of a mixture comprising a polyethylene adipate polyester having a molecular weight of from 900 to 1500 and an acid number not greater than 5, an aromatic diamine, tolylene diisocyanate and a cellulosic flour selected from the class consisting of wood flours and nut shell flours, the diamine being present in an amount ranging from 0.5 to 0.8 mol per mol of polyester, the diisocyanate being present in an amount ranging from 1.7 to 2.2 mols per mol of polyester with the diisocyanate being present in a molar excess of at least 10% more than the sum of the molecular amounts of polyester and diamine and the cellulosic flour being present in an amount ranging from 60 to 90 parts by weight per 100 parts by weight of polyester and characterized by the ability to form a non-viscous, pourable mixture when mixed with said polyester in the above amounts.

2. A wearing surface for a shoe comprising a cured polyurethane composition resulting from the reaction of a mixture comprising a polyethylene adipate polyester having a molecular weight of from 900 to 1500 and an acid number not greater than 5, a glycol, a diisocyanate selected from the group consisting of diphenyl methane 4,4'-diisocyanate and 3,3'-dimethyl 4,4'-diphenylene diisocyanate and a cellulosic flour selected from the class consisting of wood flours and nut shell flours, the glycol being present in an amount ranging from 0.5 to 0.8 mol per mol of polyester, the diisocyanate being present in an amount ranging from 1.7 to 2.2 mols per mol of polyester with the diisocyanate being present in a molar excess of at least 10% more than the sum of the molecular amounts of polyester and glycol and the cellulosic flour being present in an amount ranging from 60 to 90 parts by weight per 100 parts by weight of polyester and characterized by the ability to form a non-viscous, pourable mixture when mixed with said polyester in the above amounts.

3. A heel for a shoe comprising a cured polyurethane composition resulting from the reaction of a mixture comprising a polyethylene adipate polyester having a molecular weight of from 900 to 1500 and an acid number not greater than 5, an aromatic diamine selected from the class consisting of benzidine; tolidine; 1,5-naphthalene diamine; tolylene diamine; methylene bis-ortho-chloroaniline; isopropylidene, bis-ortho-chloroaniline and dichlorobenzidine, tolylene diisocyanate and a cellulosic flour selected from the class consisting of wood flours and nut shell flours, the diamine being present in an amount ranging from 0.5 to 0.8 mol per mol of polyester, the diisocyanate being present in an amount ranging from 1.7 to 2.2 mols per mol of polyester with the diisocyanate being present in a molar excess of at least 10% more than the sum of the molecular amounts of polyester and diamine and the cellulosic flour being present in an amount ranging from 60 to 90 parts by weight per 100 parts by weight of polyester and characterized by the ability to form a non-viscous, pourable mixture when mixed with said polyester in the above amounts.

4. A heel for a shoe comprising a cured polyurethane composition resulting from the reaction of a mixture comprising a polyethylene adipate polyester having a molecular weight of from 900 to 1500 and an acid number not greater than 5, a glycol selected from the class consisting of ethylene glycol; propylene glycol; butane diol-1,4; paraxylene glycol, the bis-hydroxyethyl ether of hydroquinone and the chlorinated derivatives of the aromatic glycols, a diisocyanate selected from the group consisting of diphenyl methane, 4,4'-diphenyl diisocyanate and 3,3'-dimethyl, 4,4'-diphenylene diisocyanate and a cellulosic flour selected from the class consisting of wood flours and nut shell flours, the glycol being present in an amount ranging from 0.5 to 0.8 mol per mol of polyester, the diisocyanate being present in an amount ranging from 1.7 to 2.2 mols per mol of polyester with the diisocyanate being present in a molar excess of at least 10% more than the sum of the molecular amounts of polyester and glycol and the cellulosic flour being present in an amount ranging from 60 to 90 parts by weight per 100 parts by weight of polyester and characterized by the ability to form a non-viscous, pourable mixture when mixed with said polyester in the above amounts.

5. A wearing surface for a shoe comprising a cured polyurethane composition resulting from the reaction of a liquid and pourable mixture comprising (1) a polyethylene adipate polyester having the molecular weight of from 900 to 1500 and an acid number not greater than 5; (2) a reticulator; (3) a diisocyanate selected from the group consisting of tolylene diisocyanate, diphenylmethane-4,4'-diisocyanate and 3,3'-dimethyl-4,4' - diphenylene diisocyanate; and (4) a cellulosic flour selected from the class consisting of wood flours and nut shell flours; the reticulator being present in an amount ranging from 0.5 to 0.8 mol per mol of polyester and being selected from the class consisting of benzidine; tolidene; 1,5-naphthalene diamine; tolylene diamine; methylene bis-ortho-chloroaniline; isopropylidene, bis-ortho-chloroaniline and dichlorobenzidine when the diisocyanate is tolylene diisocyanate and of ethylene glycol; propylene glycol; butane diol-1,4; paraxylene glycol, the bis-hydroxyethyl ether of hydroquinone and the chlorinated derivatives of the aromatic glycols when the diisocyanate is diphenylenemethane-4,4'-diisocyanate and 3,3'- dimethyl-4,4'-diphenylene diisocyanate; the diisocyanate being present in an amount ranging from 1.7 to 2.2 mols per mol of polyester and with the diisocyanate being present in a molar excess of at least 10% more than the sum of the molar amounts of polyester and reticulator; and the cellulosic flour being present in an amount ranging from 60 to 90 parts by weight per 100 parts of polyester and being characterized by yielding a non-viscous pourable mixture when mixed with the above polyester in the above amounts.

6. A composition capable of reacting to form a cured polyurethane suitable for a top lift for a woman's shoe, comprising a mixture of (1) a polyethylene adipate polyester having the molecular weight of from 900 to 1500 and an acid number not greater than 5; (2) a reticulator; (3) a diisocyanate selected from the group consisting of tolylene diisocyanate, diphenylmethane-4,4'-diisocyanate and 3,3'-dimethyl-4,4'-diphenylene diisocyanate; and (4) a cellulosic flour selected from the class consisting of wood flours and nut shell flours; the reticulator being present in an amount ranging from 0.5 to 0.8 mol per mol of polyester and being selected from the class consisting of benzidine; tolidene; 1,5-naphthalene diamine; tolylene diamine; methylene bis-ortho-chloroaniline; isopropylidene, bis-ortho-chloroaniline and dichlorobenzidine when the diisocyanate is tolylene diisocyanate and of ethylene glycol; propylene glycol; butane diol-1,4; paraxylene glycol, the bis-hydroxyethyl ether of hydroquinone and the chlorinated derivatives of the aromatic glycols when the diisocyanate is diphenylenemethane-4,4'-diisocyanate and 3,3'-dimethyl-4,4'-diphenylene diisocyanate; the diisocyanate being present in an amount ranging from 1.7 to 2.2 mols per mol of polyester and with the diisocyanate being present in a molar excess of at least 10% more than the sum of the molar amounts of polyester and reticulator; and the cellulosic flour being present in an amount ranging from 60 to 90 parts by weight per 100 parts of polyester and being characterized by yielding a non-viscous pourable mixture when mixed with the above polyester in the above amounts.

7. A top lift for a woman's shoe as defined by claim 3 in which the polyester has a molecular weight of approximately 1000, the diamine is methylene bis(ortho chloro aniline) and the cellulosic flour is walnut shell.

8. A top lift as defined by claim 4 in which the polyester has a molecular weight of approximately 1000, the glycol is ethylene glycol and the cellulosic flour is walnut shell flour.

9. A top lift for a woman's shoe comprising 100 parts by weight of a polyethylene adipate polyester having a molecular weight of approximately 1000, approximately 34 parts by weight of tolylene diisocyanate, approximately 20 parts by weight of methylene bis (ortho chloro aniline)

and approximately 75 parts by weight of walnut shell flour.

10. A top lift for a woman's shoe comprising 100 parts by weight of a polyethylene adipate polyester having a molecular weight of approximately 1000, approximately 54 parts by weight of 3,3'-dimethyl 4,4'-diphenylene diisocyanate, approximately 5 parts by weight of ethylene glycol and approximately 75 parts by weight of walnut shell flour.

References Cited in the file of this patent

UNITED STATES PATENTS

| | | |
|---|---|---|
| 2,333,639 | Christ et al. | Nov. 9, 1943 |
| 2,333,922 | Foster | Nov. 9, 1943 |
| 2,751,363 | Martin | June 19, 1956 |

FOREIGN PATENTS

| | | |
|---|---|---|
| 778,893 | Great Britain | July 10, 1957 |

UNITED STATES PATENT OFFICE
CERTIFICATE OF CORRECTION

Patent No. 3,022,257　　　　　　　　　　　　　February 20, 1962

George H. Gates et al.

It is hereby certified that error appears in the above numbered patent requiring correction and that the said Letters Patent should read as corrected below.

Column 1, line 34, for "100" read -- 1000 --; column 4, line 11, for "1130 C." read -- 113° C. --.

Signed and sealed this 12th day of November 1963.

(SEAL)
Attest:
ERNEST W. SWIDER　　　　　　　　　　　　　　EDWIN L. REYNOLDS

Attesting Officer　　　　　　　　　　　　Acting Commissioner of Patents